Figure 7:
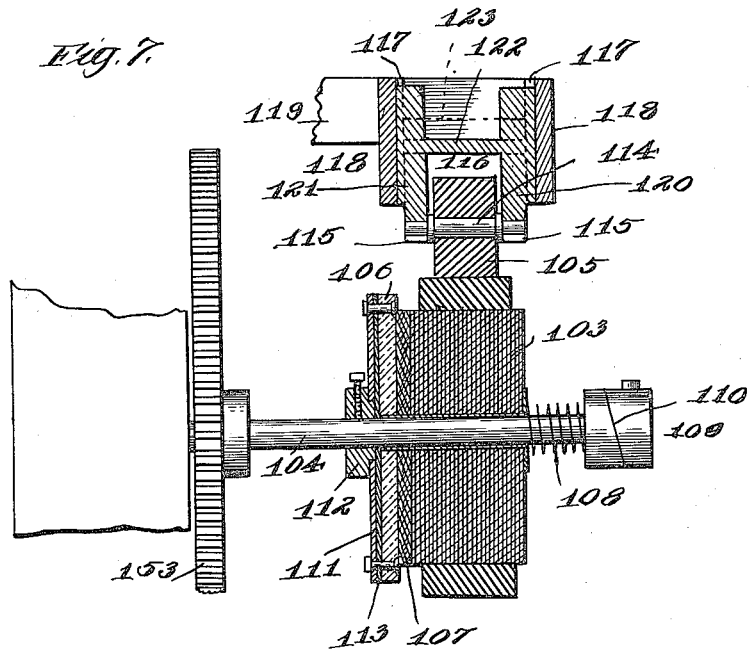

E. E. & D. E. GRAY.
MACHINE FOR FORMING SEED TAPE.
APPLICATION FILED AUG. 17, 1909. RENEWED OCT. 1, 1915.
1,160,278.
Patented Nov. 16, 1915.
5 SHEETS—SHEET 1.
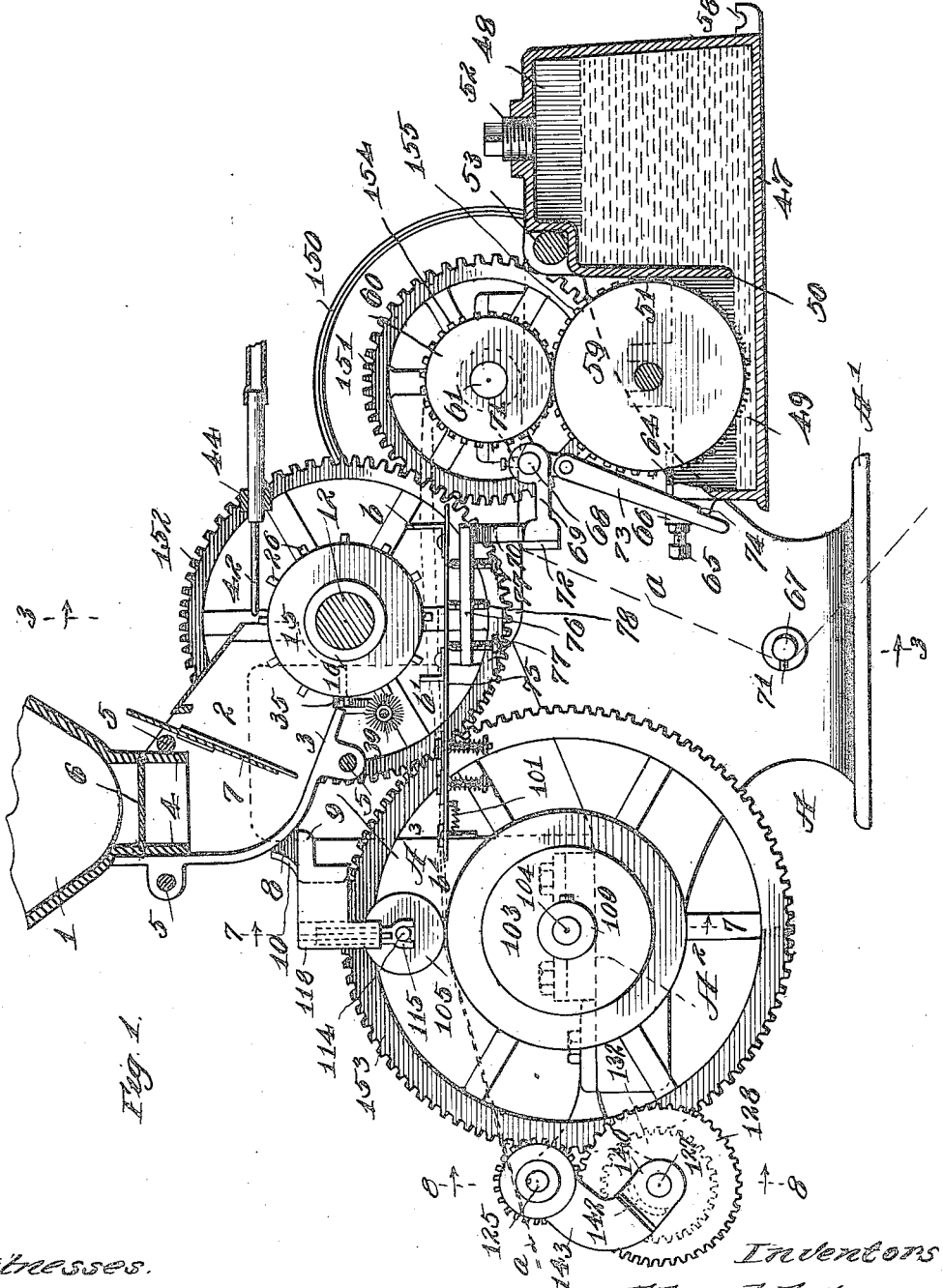

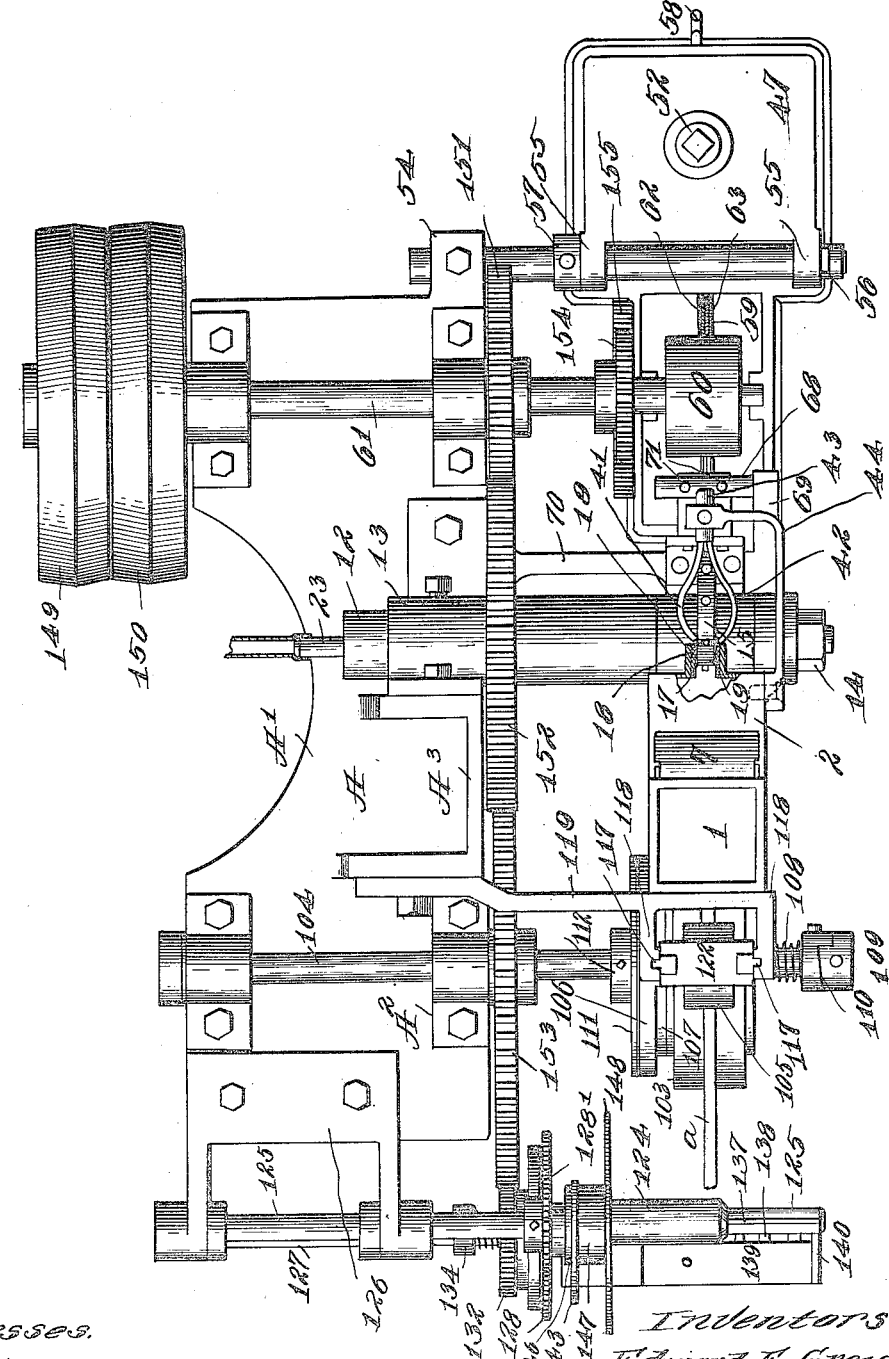

E. E. & D. E. GRAY.
MACHINE FOR FORMING SEED TAPE.
APPLICATION FILED AUG. 17, 1909. RENEWED OCT. 1, 1915.
1,160,278.
Patented Nov. 16, 1915.
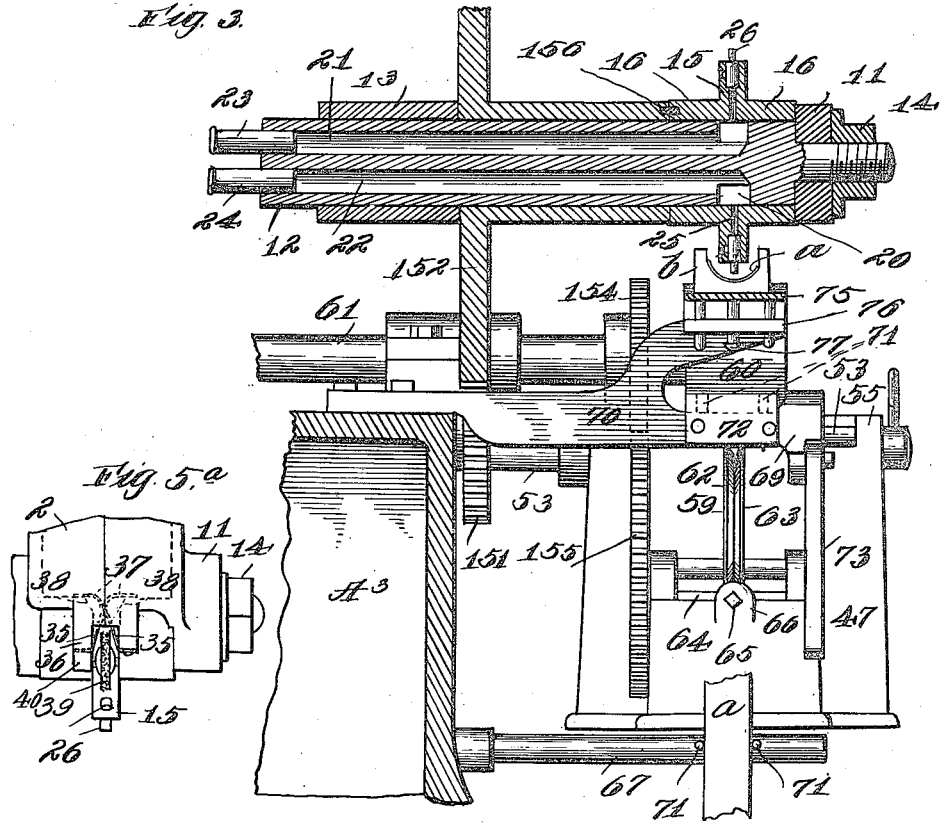
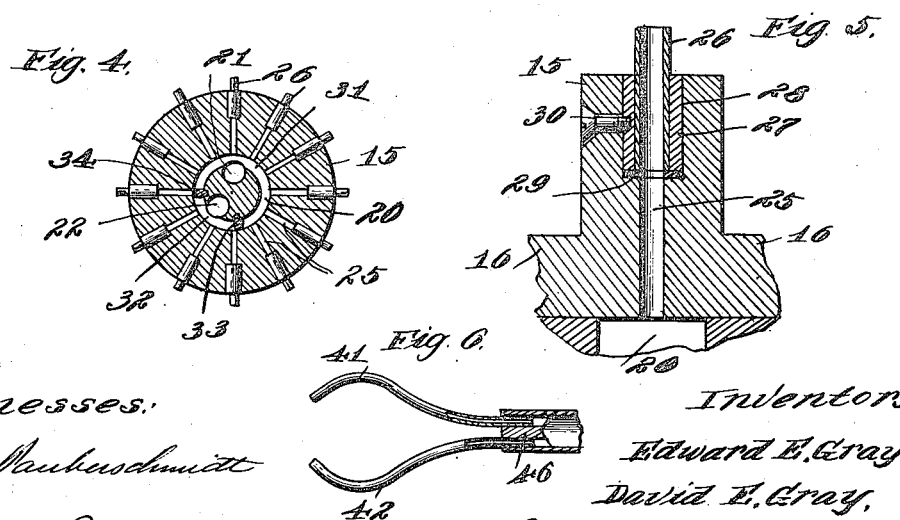
Witnesses:
Inventors
Edward E. Gray
David E. Gray,
By Geo. E. Waldo,
Atty E. E. & D. E. GRAY.
MACHINE FOR FORMING SEED TAPE.
APPLICATION FILED AUG. 17, 1909. RENEWED OCT. 1, 1915.

1,160,278.

Patented Nov. 16, 1915.
5 SHEETS—SHEET 4.

Witnesses.

Inventors.
Edward E. Gray,
David E. Gray,
By Geo. E. Waldo, Atty

E. E. & D. E. GRAY.
MACHINE FOR FORMING SEED TAPE.
APPLICATION FILED AUG. 17, 1909. RENEWED OCT. 1, 1915.
1,160,278.
Patented Nov. 16, 1915.
5 SHEETS—SHEET 5.
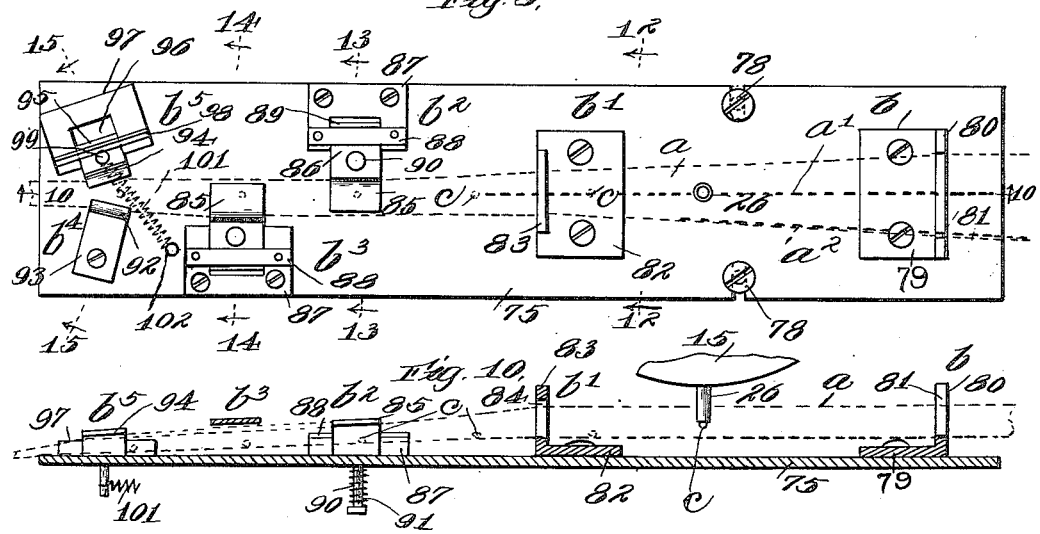
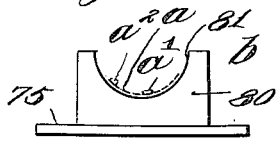
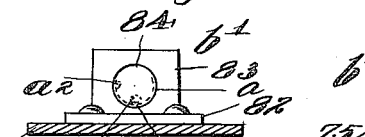
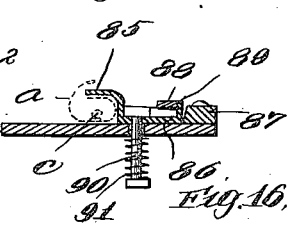
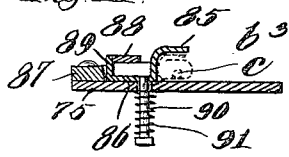
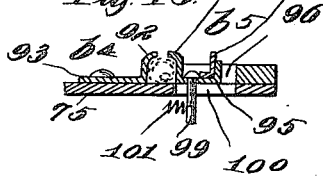
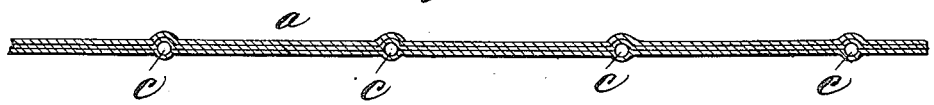

UNITED STATES PATENT OFFICE.

EDWARD E. GRAY AND DAVID E. GRAY, OF HINSDALE, ILLINOIS, ASSIGNORS, BY MESNE ASSIGNMENTS, TO AMERICAN SEEDTAPE COMPANY, OF CHICAGO, ILLINOIS, A CORPORATION OF ILLINOIS.

MACHINE FOR FORMING SEED-TAPE.

1,160,278.      Specification of Letters Patent.      Patented Nov. 16, 1915.

Application filed August 17, 1909, Serial No. 513,359. Renewed October 1, 1915. Serial No. 53,656.

*To all whom it may concern:*

Be it known that we, EDWARD E. GRAY and DAVID E. GRAY, citizens of the United States, and residents of Hinsdale, in the county of Du Page and State of Illinois, have invented certain new and useful Improvements in Machines for Forming Seed-Tape, of which the following is a specification.

This invention relates to machines for forming what is commonly known as "seed tape."

For convenience in planting, seeds of various kinds are sometimes incased in a continuous envelop of suitable light paper, or the like, which will disintegrate readily when subjected to moisture, as the moisture of the soil in which the seeds are planted, thus permitting the seed to germinate and grow in the usual way.

A primary object of the present invention is to provide an improved machine for this purpose, which will operate with certainty and uniformity to select a seed or a predetermined number of seeds from a hopper or other suitable receptacle and to deposit them at regular intervals on the paper in which they are to be incased.

A further object of the invention is to provide a machine comprising improved and simplified means for applying gum or glue to and for folding the strip of paper on which the seeds are deposited to form an envelop which will be securely sealed and the seed held against displacement during the folding and sealing of the envelop.

Still further objects of the invention are to provide an improved mechanism for feeding the paper for forming the envelop through the machine; for folding said paper; and for winding the finished tape upon spools in convenient form for handling and use.

To effect the various objects of our invention, a machine embodying our invention comprises the various features, combinations of features and details of construction hereinafter described and claimed.

Figure 8:
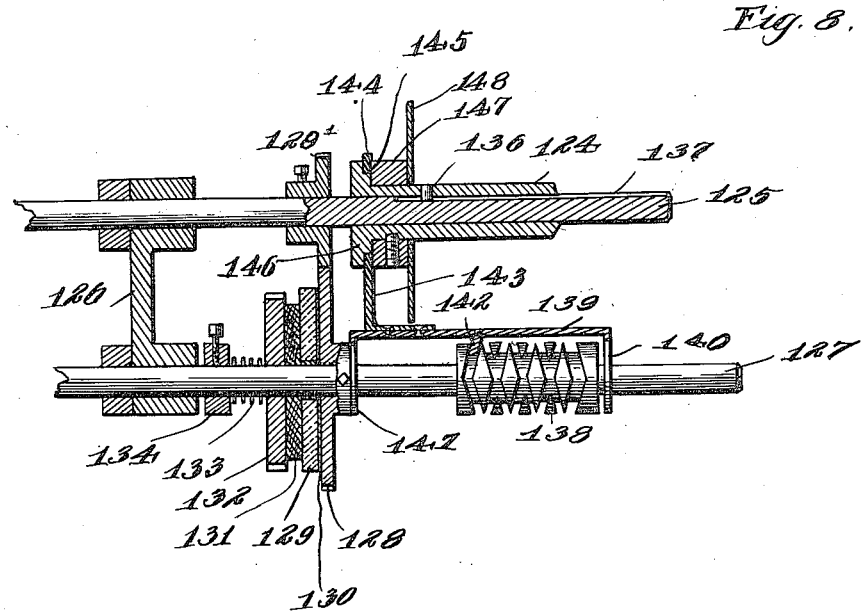

In the accompanying drawings, in which our invention is fully illustrated—Figure 1 is a side elevation of our improved machine, parts thereof being shown in section. Fig. 2 is a top plan view thereof. Fig. 3 is a partial sectional elevation thereof on the line 3—3 of Fig. 1, on an enlarged scale. Fig. 4 is a central sectional view of the seed-feeding wheel taken at right angles to its axis of rotation. Fig. 5 is an enlarged fragmentary detail sectional view of said seed-feeding wheel taken parallel with its axis of rotation, showing particularly the manner of securing the nipples therein. Fig. $5^a$ is a fragmentary rear view of the hopper and seed-feeding means, showing springs adapted for closing the opening in the hopper bottom through which the nipples on said seed-feeding wheel pass and a brush wheel for the ends of said nipples. Fig. 6 is an enlarged plan view, partly in section, of the blower for removing surplus seeds from the nipples of the seed-feeding wheel. Fig. 7 is an enlarged detail sectional view of the compression and tension device, taken substantially on the line 7—7 of Fig. 1. Fig. 8 is an enlarged detail sectional view of the winding device or reel, taken substantially on the line 8—8 of Fig. 1. Fig. 9 is a top plan view, on an enlarged scale, of the paper folding guides and of the plate on which they are mounted. Fig. 10 is a sectional elevation of said plate and folding guides on the line 10—10 of Fig. 9. Fig. 11 is an end view thereof showing the first or right hand guide of Fig. 9. Fig. 12 is a sectional view of said plate on the line 12—12 of Fig. 9, showing an end view of the second guide. Fig. 13 is a sectional view on the line 13—13 of Fig. 9. Fig. 14 is a sectional view on the line 14—14 of Fig. 9. Fig. 15 is a sectional view on the line 15—15 of Fig. 9. Fig. 16 is a cross sectional view of the tape after passing the folding guides and before passing through the compressing and tension rollers; and Fig. 17 is a longitudinal sectional view of a section of the finished tape.

Referring now to the drawings, A designates the frame of our improved machine comprising a supporting base $A^1$, a table $A^2$ and a column or standard $A^3$ extending upwardly from said table.

The seed upon which the machine is designed to operate, is adapted to be contained in a hopper 1 the lower end of which communicates with a chute or spout 2 having an inclined bottom 3 along which the seed will descend by gravity. In the preferable construction shown, the hopper 1 and spout or chute 2 are made separate from each other, the hopper proper 1 resting upon the upper edge of said spout or chute and being provided with a downward extension 4 fitted to the open upper end of said chute or spout. For convenience of construction, also, said spout or chute is made in two sections connected by means of bolts 5.

The passageway from the hopper 1 to the chute or spout 2 is controlled by means of a sliding gate 6 and said chute or spout is controlled by means of a gate 7 adapted to slide in suitable bearings formed on the lateral sides of said chute or spout. The hopper 1 and chute or spout 2 are supported in the following manner:—Formed at the rear side of the chute or spout 2 is a lug 8 which rests on a corresponding lug 9 on a bracket 10 rigidly secured to and which projects laterally from the upright column or standard $A^3$ of the machine frame. Formed on the front end of said chute or spout is a boss 11 provided with a bearing which engages the reduced outer end of a stud 12 secured in a suitable bearing formed in a bearing block 13 secured to the front side of the column or standard $A^3$. For reasons presently apparent, said stud 12 is preferably secured in its bearing in such manner that it may be turned or adjusted axially, as by a set screw. A nut 14 threaded to the reduced outer end of the stud 12 operates to hold the boss 11 and thus the chute or spout 2 in position on said stud. The seed contained in the spout or chute 2 is adapted to be extracted or withdrawn from and to be deposited at regular intervals upon the paper in which they are to be incased, indicated at $a$, in the following manner:—

Mounted on the stud 12 so as to turn freely thereon, is a wheel 15, said wheel being preferably provided with a long hub 16 to provide a bearing of desired length therefor. Said feed wheel 15 is positioned in a hole or opening 17 formed in the front wall of the hopper, the edges of which closely embrace the sides of said wheel. The walls of the hopper at the sides of said opening are preferably extended at the sides of said wheel, as shown at 18, to provide a bearing of considerable width between said wheel and the wall of the hopper at the sides of said opening. In order to insure against the seed falling out of the hopper through the space between said wheel and the sides of the opening 17, strips of packing, as hairfelt, or the like, indicated at 19, are preferably secured to the faces or surfaces of the hopper walls, which will form tight joints between said feed-wheel and the hopper walls. The position of the feed-wheel 15 is such that its axis will be about even with the bottom of the chute or spout 2.

Formed in the stud 12 centrally beneath the feed-wheel 15, is a circumferential groove or channel 20 communicating with which are holes or passages 21 and 22 formed lengthwise in said stud 12. Secured in the open ends of said holes or passages 21 and 22 are nipples 23 and 24 to which hose, not shown, are adapted to be attached for the purpose of connecting said holes or passageways 21 and 22 with a suction pump and with an air compressor, respectively.

Formed in the feed wheel 15 are any desired number of radial holes or passageways 25 the inner ends of which communicate with the groove or channel 20 in the stud 12, and the outer ends of which open through the perimeter of said feed-wheel. Removable nipples 26 are preferably secured in the outer ends of the holes or passageways 25, the outer ends of which project beyond the surface of the feed-wheel 15 and which are preferably so constructed and arranged that they may be quickly and conveniently inserted and removed, thus providing for removing one set of nipples and substituting others, to adapt the machine for use with seeds of different sizes. Said nipples 26 are provided with holes or passageways which form continuations of the holes or passageways 25 in the feed-wheel 15 when said nipples are inserted in said feed-wheel, the sizes of the holes or passageways in said nipples corresponding to the size of the seed on which the machine is operating at any given time. To provide for quickly and conveniently removing said nipples and for substituting others, said nipples are secured, as by soldering, in suitable bushings 27 which are closely fitted to sockets 28 formed in the perimeter of the feed-wheel 15 concentric with the holes or passageways 25. To prevent the admission of air to the holes or passageways 25 around the outer sides of the bushings 27, suitable packing, as rubber gaskets, 29, is inserted between the inner ends of said bushings 27 and the bottoms of the sockets 28, suitable means being provided for exerting an endwise thrust on the bushings 27 to exert a desired pressure on the gaskets 29 to insure tight joints between the inner ends of said bushings and the bottoms of the sockets 28. As shown, this is effected by means of screws 30 having beveled heads, which extend freely through holes in the side of the feed wheel 15 and engage suitable screw threaded holes or openings in the bushings 27, the holes in the feed wheel being larger than the body portions of said screws and the outer ends thereof being countersunk to correspond with the bevel of the heads of the screws 30 and said holes being so positioned that the heads of the screws 30 will come into bearing with the outer sides of the countersunk portions thereof in the first instance. Thus, as said screws 30 are set up, the beveled heads thereof, acting against the countersunk portions of said holes will exert a wedging action which will operate to force the bushings 27 into the sockets 28, and thus to compress the gaskets 29 to form tight joints, in the manner desired.

The groove or channel 20 is divided into two sections 31 and 32 by means of partitions 33 and 34, the positions of said partitions 33 and 34 being such that the holes or passageways 25 in the feed wheel 15 will pass into engagement with the section 32 of the groove or channel 20 when the nipples 26 are directed downward toward the strip of paper a supported beneath said feed-wheel, and will pass into engagement with the section 31 of said groove or channel 20 at about the time said nipples pass upwardly through the bottom 3 of the chute or spout 2 into the interior thereof.

With the described construction it is obvious that when the passageways 25 are in communication with the section 31 of the groove or channel 20, they will exert a suction, a desirable suction for ordinary purposes being produced by a vacuum of from ten to twelve inches in the suction chamber 31 and its connections. Likewise, when the passageways 25 are in communication with the section 32 of the groove or channel 20, jets of air will be discharged therefrom, jets of desired strength for ordinary purposes being produced by an air pressure of approximately 3 pounds in said chamber 32 and its connections. Thus, as the nipples 26 pass through the seed contained in the spout or chute 2, being in communication with the chamber 31, the suction thereof will operate to cause a seed or seeds to adhere to the ends of said nipples. As soon, however, as the inner ends of said passageways 25 pass the partition 33 and come into communication with the compartment 32, the seed adhering to the ends of said nipples will be blown off therefrom by the air jets discharged through said passageways onto the strip of paper a supported beneath the feed wheel 15. It is also obvious that the seed discharged from the nipples 26 will strike the paper a with considerable force, which will tend to cause them to rebound therefrom and to either fall off from said strip of paper or to be distributed at irregular intervals thereon. The larger and heavier seed have the greatest tendency to thus rebound. It is found, in practice, that this tendency to rebound can be overcome to a large extent by varying the axial position or adjustment of the stud 12 to advance or retract the partitions 33 and 34 which separate the groove or channel 20 into sections or compartments, so that fluid under pressure will be admitted to the nipples 26, and the seed discharged therefrom when said nipples are at different angles relatively to the strip of paper a, whereby the seed may be caused to strike the surface of the strip of paper a at greater or less angles. Skilled operators will soon learn the proper angles of inclination for producing the best results with different kinds of seeds and, in any event, this can be readily ascertained by a little experiment. Owing to the manner of securing the stud 12 in its bearings, said stud may be readily adjusted to cause the seed to strike the paper a at any desired angle.

To prevent the seed contained in the spout or chute 2 from falling through the opening in the bottom of the hopper through which the nipples 26 pass into said spout or chute, means are provided for maintaining said opening normally closed, said means being of such character that they will yield laterally to permit said nipples to pass through said opening and will close automatically behind said nipples. As shown, said means consist of light leaf springs 35, see particularly Fig. 5ª, the lower ends of which are secured, as by screws, to the lower ends of lugs 36 depending from the bottom of the spout or chute 2, said springs 35 converging upwardly so as to come into contact with each other at a point preferably slightly below the inner surface of the bottom of said spout or chute. The upper ends of said springs are bent outwardly, forming sections 37 which bear against the inner side of the bottom of said spout or chute at the side of the opening 17 therein in which the feed-wheel 15 is positioned. Said springs 35 are preferably curved between the upright sections and the lateral sections 37 thereof. Beneath the lateral extensions 37 of the springs 35, the opening in the hopper bottom is preferably flared upwardly, as shown at 38 to provide for desired movement of said springs.

To provide for keeping the nipples 26 clean and the open ends of the passageways 25 unobstructed, we preferably provide a brush wheel 39 through which said nipples 26 will pass after the seed have been discharged therefrom and before they enter said spout or chute. As shown, said brush wheel is rotatably mounted on a stud projecting laterally from the lower end of a lug 40 forming a downward extension of one of the lugs 36 to which the springs 35 are secured.

To provide for removing surplus seed from the ends of the nipples 26 and for returning them into the spout or chute 2, we provide a nozzle or nozzles adapted for discharging a jet or jets of air into the opening 17 in the front wall of the spout or chute 2, in which the feed wheel 15 is mounted, as heretofore described, said nozzle or nozzles being so positioned that the air jet or jets therefrom will pass across the ends of the nipples 26 just as they are passing out of said opening 17 in the front wall of said chute or spout. In the preferable construction shown, we employ two such jet nozzles formed at the ends of tubes 41 and 42, the opposite ends of which are in open communication with a rigid tube 43 mounted in the end of a bracket 44 secured to a side wall of the spout or chute 2. The pipe or tube 43 is adapted to be connected with a suitable source of supply of air under pressure, not shown, by a flexible tube or the like, connected to the end thereof. As shown, the tubes 41 and 42 are secured in holes or passageways formed in a plug 46 secured in the end of the pipe or tube 43 and said tubes 41 and 42 are so shaped that the jet orifices in the ends thereof will be directed toward a common point in the path of travel of the nipples 26 of the feed-wheels 15, the preferable relation for most purposes being such that the air jets therefrom will merge at a point slightly within the outer side of the opening 17 in the chute or spout 2. With the described construction, it is obvious that the ends of the nipples 26 will be subjected to the action of air jets which will operate to dislodge therefrom any seed which are not subjected to the full suction of the passageways 25. For ordinary purposes, jets of desired strength will be produced by an air pressure of about three pounds in the tube 43 and its connections.

To provide for varying the force of the air jets discharged across the ends of the nipples 26, said tubes 41 and 42 are preferably supported so that the ends thereof may be adjusted toward and from said nipples when in position for the air jets therefrom to strike said nipples, and so, also, that the ends of said tubes 41 and 42 may be elevated and depressed so that said nipples will pass through the centers of said air jets and will thus receive the full force thereof, or will pass through the edge of said air jets, thus receiving less than the full force thereof. To provide for thus adjusting said tubes 41 and 42 toward and from the nipples 26, the tube or pipe 43 is slidable endwise in its bearing in the bracket 44 and is adapted to be secured in desired position or adjustment therein by suitable means, as by a set screw.
To provide for adjusting said tubes 41 and 42 vertically, the bracket 44 is rotatably mounted on a screw threaded into the chute or hopper 2 and is adapted to be secured in any adjusted position thereon by means of said screw, the head of which bears against the outer surface of the hub on said bracket in which the bearing for said screw is formed.

The strip of paper $a$ for forming the envelop in which the seed are incased, is fed to the machine from a roll, not shown, said strip of paper being subjected to the action of different devices in its passage through the machine. These different devices and the order in which they operate on the paper are as follows:—From the supply roll, said strip of paper $a$ first passes to the gumming or gluing rollers, which also form feed rollers for feeding the strip of paper to the machine, suitable guides being provided for conducting said strip of paper from the supply roll thereto. From said gumming or gluing rollers, said strip of paper passes to the folding devices and beneath the seed-feeding wheel, said folding devices being preferably so positioned that the folding operation will begin before the seed from said seed-feeding wheel are delivered onto said strip of paper, so that, at the time the seed are delivered onto said strip of paper, the edges thereof will be bent upwardly, thus preventing the seed from being blown laterally off from the same. From the folding devices, said strip of paper $a$ passes to the combined compression and tension device, which operates to subject the glued folds thereof to pressure to insure a proper adhesion thereof and also to maintain a desired tension on said strip of paper while passing through the folding devices. From said compression and tension device, said strip of paper $a$ in the form of a continuous envelop with the seed inclosed therein and distributed at desired predetermined intervals, passes to the winding device or reel by means of which the finished tape is wound on spools to provide for conveniently handling and using the same. These various devices will now be described in order.

The gum or glue for sealing the folds of the strip of paper $a$ is contained in a suitable receptacle 47 consisting, as shown, of a closed chamber 48 and an open compartment 49 which communicates with the closed compartment 48 by an opening 50 in the wall 51 of said receptacle, adjacent to the bottom thereof. With the described construction, it is obvious that so long as the compartment 48 contains gum or glue of a greater depth than the height of the opening 50, a constant level of gum or glue equal in depth to the height of said opening 50 will be maintained in the open compartment 49 of said glue pot or receptacle. For convenience in filling and cleaning the chamber 48, an opening is formed in the top thereof which is normally closed by a plug 52 threaded therein.

The gum or glue pot 47 is pivotally supported upon a stud 53 secured in a boss 54 on the machine frame by means of lugs 55 thereon, bearings in which engage said stud 53. Said glue pot 47 is maintained in desired adjustment transversely of said machine by means of a cotter pin 56 at the outer end of said stud and a collar 57 secured to said stud inside of said glue pot. The point of suspension of said glue pot 47 is preferably such that the center of gravity of said glue pot with its contents will be in front of the stud 53, thereby tending to impart pivotal movement to said glue pot so as to raise the rear end thereof. If desired, our invention also contemplates increasing the moment tending to turn said glue pot pivotally about the stud 53 by a weight or weights carried by said glue pot. As shown, a weight or weights is adapted to be suspended from a hook 58 on the front side of said glue pot.

Mounted to rotate freely in the open compartment 49 of the glue pot or receptacle 47 is a wheel or roller 59, the lower side of which is adapted to dip into the gum or glue contained in said compartment 49 and the upper side of which is adapted to bear against the surface of a roller 60 secured to a shaft 61 rotatably mounted in suitable bearings on the machine frame. As shown, the gum or glue applying roller 59 is provided with a groove in its perimeter forming treads 62 and 63 at the edges of said wheel or roller, thus providing for applying two strips of gum or glue to the surface of the strip of paper $a$ passing around the roller 60, said strips being designated by the reference letters $a^1$ and $a^2$. Mounted on the wall of the pot or receptacle 47 at the rear of the wheel or roller 59 is a scraper plate 64 adapted for removing superfluous gum or glue from the treads 62 and 63 of the roller 59 and to prevent the gum or glue from accumulating in the groove in said wheel or roller between said treads 62 and 63. The scraper plate 64 is adapted to be adjusted by means of a screw 65 threaded through a lug 66 on the rear wall of said pot or receptacle 47.

The guides for directing the strip of paper $a$ from the supply roll between the rolls 59 and 60 comprise studs 67 and 68 secured in the main frame of the machine and in an arm 69 of a bracket 70 secured to the main frame A, secured in which are pins 71 adapted to embrace opposite sides of said strip of paper $a$. Between the guide studs 67 and 68, the strip of paper $a$ passes over the rounded edge of a plate 72 secured to the bracket 70.

The paper guides are so positioned relatively to the roller 59 that the strip of gum or glue $a^1$ applied to the paper $a$ by the tread 62 of said roller will extend substantially along the center of said strip of paper $a$ and the strip of gum or glue $a^2$ applied by the tread 63 of said roller will extend along the left hand edge of said strip of paper. As used herein, right hand and left hand refer to the various parts referred to when viewed from the right hand end of Fig. 2.

With the described construction it is obvious that the weight of the glue pot or receptacle 47 and its contents will hold the treads 62 and 63 of the roller 59 firmly against the surface of the roller 60, and that the pressure of said roller 59 against the roller 60 may be increased as desired by hanging weights on the hooks 58 at the front side of said glue pot or receptacle. Besides operating to apply gum or glue to the strip of paper $a$, the rollers 59 and 60 operate as feed rollers adapted for delivering said strip of paper $a$ from the supply roll to the machine.

The rear end of the glue pot or receptacle 47 is adapted to be secured in depressed position with the roller 59 out of engagement with the roller 60, by means of a pawl 73 pivoted to the arm 69 of the bracket 70, a notch or shoulder 74 on which is adapted to engage the upper edge of the rear wall of said glue pot or receptacle. In the operation of the machine, it will be found desirable and convenient to thus secure said roller 59 in depressed position out of contact with the roller 60 whenever it is desired to pass the end of the sheet of paper $a$ through the machine, as in starting a new roll of paper, or in case said strip of paper breaks, and also to prevent the surface of the roller 60 from becoming gummed or glued by contact with the roller 59 when there is no paper in the machine.

The folding guides are mounted upon a plate 75 adjustably supported upon a fixed plate 76 on the bracket 70, preferably in such manner that said plate 75 may be quickly and conveniently adjusted into different positions and may also be removed and replaced when desired. As shown, said plate 75 is supported in the following manner:— Threaded through the fixed plate 76 at about the center transversely of said plate 75, are screws 77 the upper ends of which bear against the under side of said plate 75, said plate being secured upon the ends of said screws 77 by means of screws 78 which extend through the plate 75 between the screws 77 at opposite sides of the center line of said plate 75 and are threaded through the fixed plate 76. With the described construction it is obvious that the plate 75 may be raised and lowered bodily, or either end or either side thereof raised or lowered separately to bring the folding guides into proper position relatively to the strip of paper $a$ and the compressing and tension rollers.

The folding guides mounted on the plate 75, as aforesaid, comprise different guides designated, respectively, as a whole, by the reference letters $b$, $b^1$, $b^2$, $b^3$, $b^4$, and $b^5$, which we will now describe, particular reference being had to Figs. 9 to 15, both inclusive, of the drawings:—

The guide $b$ consists of an angle plate comprising a base 79 adapted to be secured to the plate 75 as by screws or rivets and a flange 80 at one edge of said base which extends transversely of the plate 75 and substantially at right angles to the upper surface thereof. Formed in the upper edge of the flange 80 is a substantially semicircular opening 81 adapted to receive the strip of paper $a$ and to bend the lateral edges thereof upwardly toward each other, thus rendering the strip of paper $a$ substantially trough-shaped. The guide $b^1$ likewise consists of an angle plate comprising a base 82 adapted for securing said guide to the plate 75 and an upright flange 83 at one edge thereof, said flange being provided with a circular hole or opening 84 of considerably smaller radius than the notch 81 and the guide $b$ and which is adapted to impart a further and more abrupt curvature to the strip of paper $a$ and to bring the lateral edges thereof closer together.

The guides $b^2$ and $b^3$ are substantially similar in construction, the guide $b^2$ being located at the right hand side and the guide $b^3$ at the left hand side of the paper, the guide $b^2$ in front of the guide $b^3$. Each of said guides comprises a clip 85, the clip 85 of the guide $b^2$ being adapted to engage the right hand edge of the strip of paper $a$ and to fold the same inwardly so as to overlap and inclose the seed $c$, and the clip 85 of the guide $b^3$ being adapted to engage the left hand lateral edge of the strip of paper $a$ and to fold the same inwardly over the inwardly folded right hand edge of said strip of paper.

To provide for the seed $c$ passing beneath the clips 85 of said guides $b^2$, $b^3$, said clips 85, instead of being rigidly secured to the plate 75, are hinged thereto and are yieldingly supported so that they may rise when a seed $c$ passes beneath them. As shown, this is accomplished in the following manner:—Formed on each of the clips 85 is a base 86, the rear end of which is confined in a slot formed in the inner side of a plate 87 secured to the plate 75. The bases 86 of said clips are secured in the slots in said plates 87 by bars 88 which extend across said spaces or openings and interlock with flanges 89 on the outer ends of the base plates 86 of said clips. To provide for desired pivotal movement of the clips 85, a space is left between the upper surfaces of the base portions 86 of said clips and the under sides of the bars 88, and the shoulder against which the ends of said base plates 86 bear are preferably slightly inclined or beveled upwardly away from the adjacent sides of the flanges 89. The base plates 86 of the clips 85 are maintained normally yieldingly in contact with the surface of the plate 75 in the following manner:—Secured in said base plates 86 and extending downwardly through holes or openings in the supporting plate 75 are studs or bolts 90. Inserted between said plate 75 and nuts on the outer ends of the bolts or studs 90 and surrounding said studs or bolts as guides, are light coiled springs 91, which will operate in an obvious manner to hold the base plates 86 yieldingly against the plate 75 in the manner desired.

The guides $b^4$ and $b^5$ are located substantially in line with each other transversely of the machine and are designed to cause a further and final overlapping of the edges of the strip of paper $a$, rendering said strip of paper substantially tubular. As shown, the guide $b^4$ consists of a clip 92 having a base 93 secured in fixed position on the plate 75. The guide $b^5$ likewise consists of a clip 94 substantially similar to the clip 92 having a base 95 which is fitted to and movable toward and from the fixed guide $b^4$ in a suitable guide slot 96 formed in a plate 97 secured in fixed position on the plate 75. Movement of the clip 94 toward and from the fixed guide $b^4$ is limited by the rear end of the guide slot 96 and by a bar 98 which extends across said guide slot in position to engage an upwardly extending flange at the rear end of the base 95 of said clip 94. Secured in the base 95 of said clip 94 is a stud 99 which projects downwardly through a slot 100 formed in the plate 75. A spring 101 attached to the stud 99 and to a pin 102 secured in the plate 75 operates to maintain the clip 94 normally at the limit of its approach toward the fixed clip 92, while, at the same, permitting the clip 94 to yield away from the clip 92 in case of irregularities in the paper passing through said guide, which might otherwise cause said strip to catch on said guides and be torn thereby. In order that irregularities in the strips $a$ may not catch on the front edges of the clips 92 and 94, but will enter the opening between said clips freely and will exert a pressure thereon tending to force the clip 94 outwardly away from the fixed clip 92, the guides $b^4$ and $b^5$ are preferably disposed at an angle to the direction of movement of the paper $a$, the relation being such that the opening between the clips 92 and 94 at the entering side thereof will be larger than at the opposite side of said clips.

The strip of paper $a$ passes beneath the seed-feeding wheel 15, the position of said strip of paper being such that the strip of gum or glue $a^1$ thereon will be in line with the air jets from the nipples 26 on said seed-feeding wheel so that the seed discharged from said nipples will be deposited by said air jets upon said gummed or glued strip $a^1$. For the purposes of our invention, we prefer to use a gum or glue which is quite soft and at the same time highly adhesive, as fish glue. Thus when the seed discharged from the seed-feeding wheel strike the strip of gum or glue $a^1$, they will almost invariably adhere thereto at the point at which they strike the same. As a further safeguard against the seed falling off from the strip of paper $a$, the guides $b$ $b^1$ are located at opposite sides, front and back, of the seed-feeding wheel so that the section of said paper in which the seed are deposited will be substantially trough-shaped. Thus even should a seed fail to stick to the gummed or glued strip $a^1$, the upwardly turned edges of said paper would operate to confine it thereon. Moreover, in striking said strip of gum or glue it will receive a coating of adhesive which will cause it to adhere to the paper when it again comes into contact therewith. Obviously, these various precautions will operate to effect a substantially uniform distribution of the seed lengthwise of the strip of paper $a$ and will also prevent said seed from being thrown or from falling off therefrom, thus resulting in a practically perfect product.

From the folding guides $b^4$, $b^5$, the web or strip of paper $a$ passes to the combined tension and pressure rollers, which comprise a lower compression roller 103 rotatably mounted on a shaft 104 mounted in suitable bearings on the machine frame, and an upper idle roller 105 rotatably mounted above the lower roller 103 and adapted to be held yieldingly in contact therewith.

As shown, the lower roller 103 consists of a wooden core the surface of which is covered or coated with composition, such as is ordinarily used for making printer's ink rollers, and of considerable thickness, say from ½ to ⅝ of an inch thick.

Rotation is adapted to be imparted to the roll 103 from the shaft 104, by means of a suitable friction device. As shown, said friction device is as follows:—Secured to rotate with the shaft 104 is a glass disk 106 which is adapted to bear against a felt pad 107 secured to the adjacent face of the wooden hub of the feed roller 103. Said feed roller is maintained in desired frictional engagement with the disk 106 by means of a coiled spring 108 inserted between the opposite side of said wheel 103 and a collar 109 secured to the outer end of the shaft 104. To provide for adjusting the tension of the spring 108, the collar 109 is preferably made in two sections, the adjacent sides of which are shaped to form corresponding spiral surfaces 110. Both sections of the collar 109 are adapted to be secured to the shaft 104 by suitable means, as by set screws. Thus, by securing the outer section of said collar to said shaft 104, and turning the inner section of said collar, in the proper direction, said inner section will be forced inwardly away from the outer section of said collar, thereby compressing the spring 108. When said spring 108 has been compressed to a desired extent, said inner section is secured in rigid adjustment with the shaft 104, by means of the set screw applied thereto.

As shown, the disk 106 is connected to the shaft 104 by bolting or riveting said glass disk 106 to a metal disk 111 having a hub 112 provided with a bearing fitted to the shaft 104, said disk 111 being secured to said shaft by any suitable means, as by a set screw inserted through the hub 112 thereof. To relieve the glass disk 106 from strain incident to tightening the bolts or rivets which connect the same to the metal disk 111, a thin felt cushion 113 is preferably inserted between said disks 106 and 111.

The upper idle roller 105 is likewise made of composition such as is ordinarily used in the manufacture of inking rollers for printer's use, cast upon a central stock or spindle 114 formed at the ends of which are trunnions which engage suitable yoke bearings 115 formed in a frame 116 slidably mounted in suitable upright guide bearings 117 formed at the ends of arms 118 on a bracket 119 secured to the upright column $A^3$ of the machine frame.

As shown, the frame 116 in which the roller 105 is supported consists of upright side frame members 120 and 121 provided on their outer sides with tongues fitted to the guide bearings 117 in the arms 118. The side frame members 120 and 121 are connected at a distance below their upper ends by a flat web 122 of considerably greater width than the upright frame members 120 and 121. This construction affords convenient means for increasing the weight to which the idle roller 105 is subjected in use, this being effected by means of removable weights placed on the web 122, said weights being provided with notches in their lateral edges adapted to receive the upper ends of the side frame members 120 and 121, thereby securing them in position on said web 122 against accidental displacement. In the drawings, we have indicated one such weight in dotted lines at 123.

The shaft 104 is driven at a speed corresponding to a surface speed of the roller 103 considerably higher than the rate of travel of the strip of paper $a$ under the influence of the roller 59 and 60. The tension device by means of which said roller 103 is driven will permit retardation of said roller to the same surface speed as the travel of the paper $a$. The tendency of said roller to a higher surface speed will, however, produce a tension on said strip *a* which will maintain said strip taut through the folding guides, which can be adjusted as desired by means of the tension device, in the manner heretofore explained.

The rollers 103, 105 will also exert a pressure on the interfolded strip *a* as it passes between them sufficient to cause the gummed or glued folds thereof to adhere, but the surfaces of said rollers being soft and yielding, they will not crush the seed inclosed in said tape.

Where the character of the seed will permit, as where they are smooth and substantially round, we prefer to adjust the plate 75 so that, in passing from the folding guides to the compression and tension rollers, the strip of paper *a*, with its edges overlapping, will draw over the rear edge of said plate 75, which will operate, in an obvious manner, to flatten the same before it reaches said compression and tension rollers. Where the seed have sharp corners, however, it is found that they are liable to tear the paper if drawn over the edge of the plate 75 and with seed of this character, said plate will be adjusted so that said strip of paper will not come into contact therewith.

From the rolls 103, 105, the tape, folded, glued and with the seed inclosed, passes to the winding device or reel by means of which it is wound into rolls or coils, which are subsequently removed from said winding device and placed on separate spools which, together with the roll or coil of seed tape wound thereon, are adapted to be packed for use in a box or carton. As shown, said tape is adapted to be wound upon a sleeve 124 secured to rotate with a shaft 125 rotatably mounted in suitable bearings in a bracket 126 secured to the main frame of the machine. As shown, rotation is imparted to the shaft 125 from a shaft 127, likewise mounted in bearings in the bracket 126, a gear 128 on which meshes with a gear 128¹ secured to the shaft 125. The shaft 127 is driven by means of a suitable friction device which, as shown, is substantially the same as the friction device applied to the wheel 103, comprising a glass disk 129 secured to the face of the gear 128, a thin felt cushion 130 being preferably interposed between said glass disk 129 and the gear 128, a felt pad 131 secured to a driving gear 132 mounted to turn freely on the shaft 127 and a spring 133 inserted between the gear 132 and a collar 134 secured on said shaft 127. As shown, the sleeve 124 on which the tape is wound is splined to the shaft 125, as by a pin 136 secured therein, which engages a slot 137 formed lengthwise in said shaft 125, and a traverse is adapted to be imparted to said sleeve 124 to provide for winding the tape in coiled layers back and forth on said spool. As shown, the means for imparting a traverse to said spool 124 is as follows:—Secured to rotate with the shaft 127 is a screw 138 formed in which are intersecting right and left hand screw threads, the ends of which are connected or run into each other. Supported adjacent to the screw 138 so as to be freely movable transversely of the machine, is a carriage pivotally mounted on which is a shoe adapted to engage the screw teeth in the screw
138. As shown, said carriage consists of a plate 139 which extends over the screw 138 and is supported upon and connected to the shaft 127 by means of the downwardly turned ends 140 and 141 thereof, said ends being provided with suitable bearings slidably fitted to said shaft. The distance between the downwardly turned ends 140 and 141 of said plate 139 is sufficiently greater than the length of the screw 138 to provide for movement of said plate 139 under the influence of said screw 138. Pivoted to the plate 139 is a shoe 142 which engages the screw threads in the screw 138, said shoe being elongated and so shaped that it will follow said screw threads and pass freely from one to the other thereof. The plate 139 is connected to the sleeve 124 by means of a plate 143 which extends upwardly therefrom, formed at the upper end of which is a ring 144 which is confined in a groove 145 formed in a head 146 at the inner end of said sleeve 124. To provide for engaging the ring 144 with the groove 145, one side of said groove 145 is formed by a collar 147 removably secured as by a set screw, to the sleeve 124.

A disk 148 placed loosely over the sleeve 124 so as to bear against the face of the collar 147 operates to support the coil of tape while it is being wound upon the sleeve 124.

When the roll or coil has attained a desired size, it is slipped off from the sleeve 124 onto a detached spool and is then packed in a box or carton ready for use. Said coil or roll of tape can be readily removed from the sleeve 124 by a pull, as with the fingers, exerted on the disk 148.

The operative parts of the machine are all driven by means of suitable driving connection with the shaft 61, which is adapted to be driven from a suitable source of power, not shown. As shown, said shaft 61 is adapted to be driven through the medium of tight and loose pulleys 149 and 150 thereon.

The seed-feeding wheel 15, the shaft 104 and the shafts 127 and 125, are driven from said shaft 61 by means of a train of gears comprising a gear 151 secured to the shaft 61, a gear 152 secured to rotate with the seed-feeding wheel 15, a gear 153 secured to rotate with the shaft 104, the gear 132 on the shaft 127 and the gears 128 and 128¹ on the shafts 127 and 125, respectively. As shown, also, the wheel 59 for applying gum or glue to the strip of paper *a* is positively driven by means of a gear 154 on the shaft 61 which meshes with a gear 155 secured to the shaft or axle of said glue wheel.

As shown, the gear 152 is provided with an elongated hub which operates to fill the space on the stud 12 between the seed-feeding wheel 15 and said gear, and the driving connection between said gear and seed-feeding wheel consists of a pin 156 secured in the end of the hub of said gear wheel, which is adapted to engage a corresponding hole in the adjacent face of the hub of said seed-feeding wheel.

We claim:—

1. In a machine for forming seed tape, the combination of a seed receptacle, and pneumatic means for withdrawing seed from said receptacle and depositing them upon the material for forming said tape, said means comprising a tube or tubes constructed and arranged to be inserted into the seed contained in said receptacle and to be withdrawn therefrom and to be directed upon the material for forming said tape, and means for alternately creating a suction and a fluid pressure in said tube or tubes.

2. In a machine for forming seed tape, the combination of a seed receptacle, and pneumatic means for withdrawing seed from said receptacle and depositing them upon the material for forming said tape, said means comprising a tube or tubes constructed and arranged to be inserted into the seed contained in said receptacle and to be withdrawn therefrom and to be directed upon the material for forming said tape, means for alternately creating a suction and a fluid pressure in said tube or tubes and means for varying the initial point of fluid pressure in said tube or tubes relatively to the surface of the material upon which the seed are to be deposited.

3. In a machine for forming seed tape, comprising means for folding said material, the combination of a seed receptacle and pneumatic means for withdrawing seed from said receptacle and depositing them upon the material for forming said tape, the relation being such that at the point where the seed are deposited thereon said material will have been partially folded so as to be substantially trough-shaped.

4. In a machine for forming seed tape, comprising means for applying adhesive to the material for forming said tape, and means for folding said material, the combination of a seed receptacle and pneumatic means for withdrawing seed from said receptacle and depositing them upon the material for forming said tape, the relation being such that at the point where the seed are deposited said material will have been partially folded so as to be substantially trough-shaped and such, also, that the seed will be deposited upon a surface of said materal which is coated with adhesive.

5. In a machine for forming seed tape, the combination of a seed receptacle and pneumatic means for withdrawing seed from said receptacle and depositing them upon the material for forming said tape, said means comprising a wheel provided with a passageway or passageways, said wheel being rotatably mounted in such position that rotation thereof will cause the open end or ends of said passageway or passageways to pass through the seed contained in said seed receptacle and to be directed against the surface of the material for forming said tape, and means for alternately creating a suction and a fluid pressure in said passageway or passageways, respectively.

6. In a machine for forming seed tape, the combination of a seed receptacle and pneumatic means for withdrawing seed from said receptacle and depositing them upon the material for forming said tape, said means comprising a wheel provided with a passageway or passageways, a nipple or nipples secured in said passageway or passageways, said wheel being rotatably mounted in such position that rotation thereof will cause said nipple or nipples to pass through the seed contained in said receptacle and to be directed against the surface of the material for forming said tape, and means for alternately creating a suction and a fluid pressure in said passageway or passageways, respectively.

7. In a machine for forming seed tape, the combination of a seed receptacle and pneumatic means for withdrawing seed from said receptacle and depositing them upon the material for forming said tape, said means comprising a wheel provided with a passageway or passageways, a nipple or nipples, a bushing or bushings in which said nipple or nipples are secured, said wheel being provided with a socket or sockets forming enlargements of the passageway or passageways therein adapted to receive said bushing or bushings, means for removably securing said bushing or bushings in said socket or sockets, said wheel being rotatably mounted in such position that rotation thereof will cause said nipple or nipples to pass through the seed contained in said seed receptacle and to be directed against the surface of the material for forming said tape, and means for alternately creating a suction and a fluid pressure in said passageway or passageways, respectively.

8. In a machine for forming seed tape, the combination of a seed receptacle and pneumatic means for withdrawing seed from said receptacle and depositing them upon the material for forming said tape, said means comprising a wheel provided with a passageway or passageways, a nipple or nipples, a bushing or bushings in which said nipple or nipples are secured, said wheel being provided with a socket or sockets forming enlargements of the passageway or passageways therein adapted to receive said bushing or bushings, means for removably securing said bushing or bushings in said socket or sockets, packing in said sockets for forming a tight joint around said bushing or bushings, said wheel being rotatably mounted in such position that rotation thereof will cause said nipple or nipples to pass through the seed contained in said seed receptacle and to be directed against the surface of the material for forming said tape, and means for alternately creating a suction and a fluid pressure in said passageway or passageways, respectively.

9. In a machine for forming seed tape, the combination of a seed receptacle and pneumatic means for withdrawing seed from said receptacle and depositing them upon the material for forming said tape, said means comprising a wheel provided with a passageway or passageways, a stud on which said wheel is rotatably mounted in such position that rotation thereof will cause the outer end or ends of said passageway or passageways to pass through the seed contained in said seed receptacle and to be directed against the surface of the material for forming said tape, said stud being provided with separate chambers located beneath said wheel with which the inner end or ends of said passageway or passageways in said wheel are adapted to be brought into communication by rotation of said wheel, and being also provided with passageways which communicate with said chambers, respectively, said passageways in said stud being constructed and arranged for connection one with a suction device and the other with a source of supply of fluid under pressure.

10. In a machine for forming seed tape, the combination of a seed receptacle and pneumatic means for withdrawing seed from said receptacle and depositing them upon the material for forming said tape, said means comprising a wheel provided with a passageway or passageways, an axially adjustable stud on which said wheel is rotatably mounted in such position that rotation thereof will cause the outer end or ends of said passageway or passageways to pass through the seed contained in said seed receptacle and to be directed against the surface of the material for forming said tape, said stud being provided with separate chambers located beneath said wheel with which the inner end or ends of said passageway or passageways in said wheel are adapted to be brought into communication by rotation of said wheel, and being also provided with passageways which communicate with said chambers, respectively, said passageways in said stud being constructed and arranged for connection one with a suction device and the other with a source of supply of fluid under pressure.

11. In a machine for forming seed tape, the combination of a seed receptacle provided with an opening in a wall thereof, and pneumatic means for withdrawing seed from said seed receptacle and depositing them upon the material for forming said tape, said means comprising a wheel positioned in the opening in said receptacle provided with a passageway or passageways, a stud on which said wheel is rotatably mounted, said stud being provided with separate chambers located beneath said wheel with which the inner end or ends of said passageway or passageways in said wheel are adapted to be brought into communication by rotation of said wheel, and being also provided with passageways which communicate with said chambers, respectively, said passageways in said stud being constructed and arranged for connection one with a suction device and the other with a source of supply of fluid under pressure.

12. In a machine for forming seed tape, the combination of a seed receptacle provided with an opening in a wall thereof, and pneumatic means for withdrawing seed from said seed receptacle and depositing them upon the material for forming said tape, said means comprising a wheel rotatably mounted in the opening in said seed receptacle provided with a passageway or passageways, a nipple or nipples secured in said passageway or passageways, respectively, means for alternately creating a suction and a fluid pressure in said passageway or passageways, the opening in the wall of said receptacle in which said wheel is located comprising an extension to permit the passage therethrough of said nipple or nipples, and means for closing said extension of said opening constructed and arranged to be opened by said nipple or nipples and to close automatically behind the same.

13. In a machine for forming seed tape, the combination of a seed receptacle provided with an opening in a wall thereof, and pneumatic means for withdrawing seed from said seed receptacle and depositing them upon the material for forming said tape, said means comprising a wheel rotatably mounted in the opening in said seed receptacle provided with a passageway or passageways, a nipple or nipples secured in said passageway or passageways, respectively, means for alternately creating a suction and a fluid pressure in said passageway or passageways, the opening in the wall of said receptacle in which said wheel is located comprising an extension to permit the passage therethrough of said nipple or nipples, and means for closing said extension of said opening, said means comprising leaf springs, the outer ends of which are secured to fixed supports outside of said opening and which converge and contact substantially at said opening, the free ends of said springs being turned laterally to bear against the inner surface of said receptacle at the sides of the opening therein.

14. In a machine for forming seed tape, the combination of a seed receptacle, and pneumatic means for withdrawing seed from said receptacle and depositing them upon the material for forming said seed tape, said means comprising a tube or tubes constructed and arranged to be inserted into the seed contained in said receptacle and to be withdrawn therefrom and to be directed upon the material for forming said tape, means for alternately creating a suction and a fluid pressure in said tube or tubes, and means for discharging a jet or jets of air across the end or ends of said tube or tubes after being withdrawn from the seed contained in the seed receptacle and while they are subjected to suction.

15. In a machine for forming seed tape, the combination of a seed receptacle, and pneumatic means for withdrawing seed from said receptacle and depositing them upon the material for forming said seed tape, said means comprising a tube or tubes constructed and arranged to be inserted into the seed contained in said receptacle and to be withdrawn therefrom and to be directed upon the material for forming said tape, means for alternately creating a suction and a fluid pressure in said tube or tubes, and means for directing a jet or jets of air across the end or ends of said tube or tubes and into said seed receptacle after said tube or tubes have been withdrawn from the seed contained in said receptacle and while they are subjected to suction.

16. In a machine for forming seed tape, the combination of a seed receptacle, and pneumatic means for withdrawing seed from said receptacle and depositing them upon the material for forming said seed tape, said means comprising a tube or tubes constructed and arranged to be inserted into the seed contained in said receptacle and to be withdrawn therefrom and to be directed upon the material for forming said tape, means for alternately creating a suction and a fluid pressure in said tube or tubes, and means for discharging a jet or jets of air across the open end or ends of the seed-feeding tube or tubes after being withdrawn from the seed contained in said receptacle and while subjected to suction, said means comprising a tube or tubes provided with a jet orifice or orifices, respectively, and adapted for connection with a source of supply of fluid under pressure.

17. In a machine for forming seed tape, the combination of a seed receptacle, and pneumatic means for withdrawing seed from said receptacle and depositing them upon the material for forming said seed tape, said means comprising a tube or tubes constructed and arranged to be inserted into the seed contained in said receptacle and to be withdrawn therefrom and to be directed upon the material for forming said tape, means for alternately creating a suction and a fluid pressure in said tube or tubes, and means for discharging a jet or jets of air across the open end or ends of the seed-feeding tube or tubes after being withdrawn from the seed contained in said receptacle and while subjected to suction, said means comprising a tube or tubes provided with a jet orifice or orifices, respectively, and adapted for connection with a source of supply of fluid under pressure, a support provided with a bearing or bearings to which said tube or tubes are slidably fitted, and means for securing said tube or tubes in adjusted positions in said bearing or bearings.

18. In a machine for forming seed tape, the combination of a seed receptacle, and pneumatic means for withdrawing seed from said receptacle and depositing them upon the material for forming said seed tape, said means comprising a tube or tubes constructed and arranged to be inserted into the seed contained in said receptacle and to be withdrawn therefrom and to be directed upon the material for forming said tape, means for alternately creating a suction and a fluid pressure in said tube or tubes, and means for discharging a jet or jets of air across the open end or ends of the seed-feeding tube or tubes after being withdrawn from the seed contained in said receptacle and while subjected to suction, said means comprising a tube or tubes provided with a jet orifice or orifices, respectively, and adapted for connection with a source of supply of fluid under pressure, an adjustable support provided with a bearing or bearings to which said tube or tubes are slidably fitted, means for securing said tube support in different adjusted positions and means for securing said tube or tubes in adjusted positions in the bearing or bearings in said support.

19. In a machine for forming seed tape, the combination of a seed receptacle and pneumatic means for withdrawing seed from said seed receptacle and depositing them upon the material for forming said tape, said means comprising a wheel provided with a passageway or passageways rotatably mounted in such position that rotation thereof will cause the open end or ends of said passageway or passageways to pass through the seed contained in said seed receptacle and to be directed against the surface of the material for forming said tape, means for alternately creating a suction and a fluid pressure in said passageway or passageways, respectively, and means for discharging a jet or jets of air across the end or ends of said passageway or passageways in said seed-feeding wheel after they have passed through the seed contained in said seed receptacle and while subjected to suction, said means comprising a tube or tubes provided with a jet orifice or orifices, respectively, and adapted for connection with a source of supply of fluid under pressure.

20. In a machine for forming seed tape, the combination of a seed receptacle provided with an opening in a wall thereof, a seed-feeding wheel rotatably supported in said opening provided with a passageway or passageways the open end or ends of which are adapted to pass through the seed contained in said receptacle and to be directed against the surface of the material for forming said tape as said wheel rotates, means for creating an alternate suction and a fluid pressure in said passageway or passageways, respectively, and means for discharging a jet or jets of air across the end or ends of said passageway or passageways in said seed-feeding wheel and into the seed receptacle after they have passed through the seed contained in said seed receptacle and while subjected to suction, said means comprising a tube or tubes provided with a jet orifice or orifices, respectively, and adapted for connection with a source of supply of fluid under pressure.

21. In a machine for forming seed tape, the combination of a seed receptacle provided with an opening in a wall thereof, a seed-feeding wheel rotatably supported in said opening provided with a passageway or passageways the open end or ends of which are adapted to pass through the seed contained in said receptacle and to be directed against the surface of the material for forming said tape as said wheel rotates, means for creating an alternate suction and a fluid pressure in said passageway or passageways, respectively, means for discharging a jet or jets of air across the end or ends of said passageway or passageways in said seed-feeding wheel and into the seed receptacle after they have passed through the seed contained in said seed receptacle and while subjected to suction, said means comprising a tube or tubes provided with a jet orifice or orifices, respectively, and adapted for connection with a source of supply of fluid under pressure, a pivoted arm provided with a bearing or bearings to which said tube or tubes are slidably fitted and means for securing said arm in adjusted pivotal positions and for securing said tube or tubes in adjusted positions in said bearing or bearings in said arm.

22. In a machine for forming seed tape, the combination of a seed receptacle provided with an opening in a wall thereof, a seed-feeding wheel rotatably supported in said opening provided with a passageway or passageways the open end or ends of which are adapted to pass through the seed contained in said receptacle and to be directed against the surface of the material for forming said tape as said wheel rotates, means for creating an alternate suction and fluid pressure and suction in said passageway or passageways, respectively, means for discharging a jet or jets of air across the end or ends of said passageway or passageways in said seed-feeding wheel and into the seed receptacle after they have passed through the seed contained in said seed receptacle and while subjected to suction, said means comprising a pipe adapted for connection with a source of supply of fluid under pressure, and branch tubes provided with jet orifices secured in and which communicate with said pipe, said branch tubes being disposed at opposite sides of said seed-feeding wheel and the jet orifices thereof being directed to converge at a point in the path of travel of the end or ends of the passageway or passageways in said seed-feeding wheel.

23. In a machine for forming seed tape, the combination of a seed receptacle and pneumatic means for withdrawing seed from said receptacle and depositing them upon the material for forming said tape, said means comprising a wheel provided with a passageway or passageways, said wheel being rotatably mounted in such position that rotation thereof will cause the open end or ends of said passageway or passageways to pass through the seed contained in said seed receptacle and to be directed against the surface of the material for forming said tape, means for alternately creating a suction and a fluid pressure in said passageway or passageways, respectively, and a brush mounted to pass over the open end or ends of said passageway or passageways while subjected to fluid pressure.

24. In a machine for forming seed tape, the combination of folding means, seed feeding means, and means for applying adhesive to the material for forming said tape, said means comprising a pivotally supported receptacle for the adhesive, a roller rotatably mounted in bearings in said receptacle at one side of its pivotal axis with its lower side extending below the designed level of adhesive therein, a driven roller with which the roller mounted in said adhesive receptacle is adapted to contact and means adapted for turning said receptacle pivotally to maintain the roller mounted therein in contact with said driven roller.

25. In a machine for forming seed tape, the combination of folding means, seed feeding means, and means for applying adhesive to the material for forming said tape, said means comprising a receptacle for the adhesive pivotally supported at one side of its center of gravity, a roller rotatably mounted in bearings in the lighter side of said receptacle and a driven roller with which the roller mounted in said adhesive receptacle is adapted to contact, the relation being such that the unbalanced weight of said receptacle will maintain said roller mounted therein normally in contact with said driven roller.

26. In a machine for forming seed tape, the combination of folding means, seed feeding means, and means for applying adhesive to the material for forming said tape, said means comprising a receptacle comprising an open and a closed compartment which communicate with each other by means of an opening formed in the wall of said receptacle separating said compartments adjacent to the bottom of said receptacle and said closed compartment being of greater depth than said open compartment, said receptacle being pivotally supported in such manner that the weight of said closed compartment and its contents will overbalance the weight of said open compartment and its contents, a roller rotatably mounted in bearings in the open compartment of said receptacle and a driven roller with which the roller mounted in said open compartment of said receptacle is adapted to contact, whereby the unbalanced weight of the closed compartment of said receptacle with its contents will exert a turning moment upon said receptacle adapted to maintain the roller mounted in said receptacle normally in contact with said driven roller.

27. In a machine for forming seed tape, the combination of folding means, seed feeding means, and means for applying adhesive to the material for forming said tape, said means comprising a pivotally supported receptacle for the adhesive, a roller rotatably mounted in bearings in said receptacle at one side of its pivotal axis with its lower side extending below the designed level of adhesive therein, a driven roller with which the roller mounted in said adhesive receptacle is adapted to contact, means adapted for turning said receptacle pivotally to maintain the roller mounted therein normally in contact with said driven roller and means for securing said receptacle in pivotal position with the roller mounted therein out of contact with said driven roller.

28. In a machine for forming seed tape, the combination of folding means, seed feeding means, and means for applying adhesive to the material for forming said tape, said means comprising a pivotally supported receptacle for the adhesive, a roller rotatably mounted in bearings in said receptacle at one side of its pivotal axis with its lower side extending below the designed level of adhesive therein, a driven roller with which the roller mounted in said receptacle is adapted to contact, means adapted for turning said receptacle pivotally to maintain the roller mounted therein normally in contact with said driven roller and a pawl adapted to engage a rigid part of said receptacle for securing said receptacle in pivotal position with the roller mounted therein out of contact with said driven roller.

29. In a machine for forming seed tape, the combination of adhesive supplying means, seed feeding means, paper folding means, comprising folding guides, a base plate on which said folding guides are mounted, and means for adjusting said base plate vertically, said means being constructed and arranged for adjusting opposite sides of said base plate separately, substantially as described.

30. In a machine for forming seed tape, the combination of adhesive applying means, seed feeding means, and folding means, said folding means comprising folding guides mounted on a base plate supported so that the sides thereof will be freely adjustable vertically both separately and together, said supporting means comprising a fixed support, spaced screws connecting said plate with said fixed support and spaced thrust screws located between said connecting screws threaded through one of said connected parts and adapted to bear against the other thereof.

31. In a machine for forming seed tape, the combination of adhesive applying means, folding means, seed-feeding means and means for maintaining a tension on the material for forming said tape during the operation of the folding means, said means for thus maintaining a tension on said material comprising feed rollers which engage said material for forming said tape at the entering side of said folding means and opposed rollers having soft treads at the delivery side of said folding means, said opposed rollers comprising a roller driven through the medium of a friction device.

32. In a machine for forming seed tape, the combination of adhesive applying means, folding means, seed-feeding means and means for maintaining a tension on the material for forming said tape during the operation of the folding means, said means for thus maintaining a tension on said material comprising feed rollers which engage said material for forming said tape at the entering side of said folding means and opposed rollers having soft treads at the delivery side of said folding means, said opposed rollers comprising a lower roller driven through the medium of a friction device and an upper weighted roller.

In testimony that we claim the foregoing as our invention, we affix our signatures in presence of two subscribing witnesses, this 12th day of August, A. D. 1909.

EDWARD E. GRAY.
DAVID E. GRAY.

Witnesses:
K. A. COSTELLO,
C. L. ROSENON.